Inventor
CONRAD JOBST

Feb. 8, 1949.   C. JOBST   2,461,282
INJECTOR MECHANISM FOR MOLDING MACHINES
Filed July 6, 1945   4 Sheets-Sheet 4

Inventor
CONRAD JOBST

Patented Feb. 8, 1949

2,461,282

UNITED STATES PATENT OFFICE 2,461,282

INJECTOR MECHANISM FOR MOLDING MACHINES

Conrad Jobst, Toledo, Ohio, assignor, by mesne assignments, to Owens-Illinois Glass Company, Toledo, Ohio, a corporation of Ohio Application July 6, 1945, Serial No. 603,449

12 Claims. (Cl. 318—302)

1

My invention relates to injection molding machines and particularly to the injector mechanism by which the molding material is conveyed to the molds, injected into the mold cavities and compacted therein. Injection molding machines for molding organic thermoplastic materials and the like are commonly provided with means for feeding the molding compound forward to the molds while in a molten or plastic condition, and injecting it under high pressure into the mold cavities in which the material sets and hardens under heat and pressure. As the mold cavity is filled, the pressure applied thereto is increased for compacting the plastic material and causing it to completely fill the mold cavity.

An object of my invention is to provide improved means for rapidly feeding the molding material forward to the mold or molds and then applying a greatly increased pressure during the final portion of the mold-filling operation.

The invention is herein illustrated as embodied in a machine of the type disclosed in my Patent No. 2,372,833, April 3, 1945, Injection molding machine.

A feature of the present invention relates to a novel form of injection plunger and driving mechanism comprising a motor operable to drive the plunger rapidly forward for advancing the molding material to the mold, and a second motor operable through suitable speed reduction gearing to apply a greatly augmented driving force to the plunger to overcome the correspondingly increased back pressure developed as the charge of molding material enters and fills the mold.

A further object of the invention is to provide a construction in which the injection plunger is driven forward by separate motors operating through interconnected driving mechanism in such manner that the forward movement of the plunger is dependent upon the relative speed and direction of rotation of the motors and in which one motor exerting a more powerful driving torque than the other, is operable through such mechanism to reverse the weaker motor when the back pressure on the plunger is built up to a certain point, thereby serving as a safety means to prevent excessive force being applied to and through said plunger.

Other objects of the invention will appear hereinafter.

Referring to the accompanying drawings which illustrate an injection molding machine embodying my invention:

Fig. 1 is a side elevation of the machine, parts being broken away.

2

Figure 2:
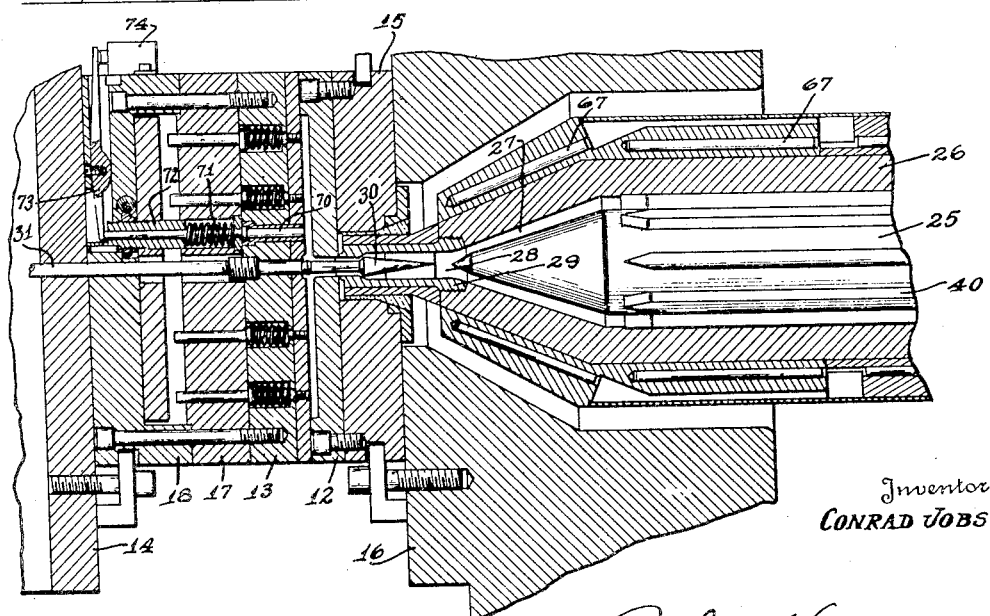
Fig. 2 is a central longitudinal sectional elevation on a larger scale of the mold and a portion of the injector.
Figure 3:
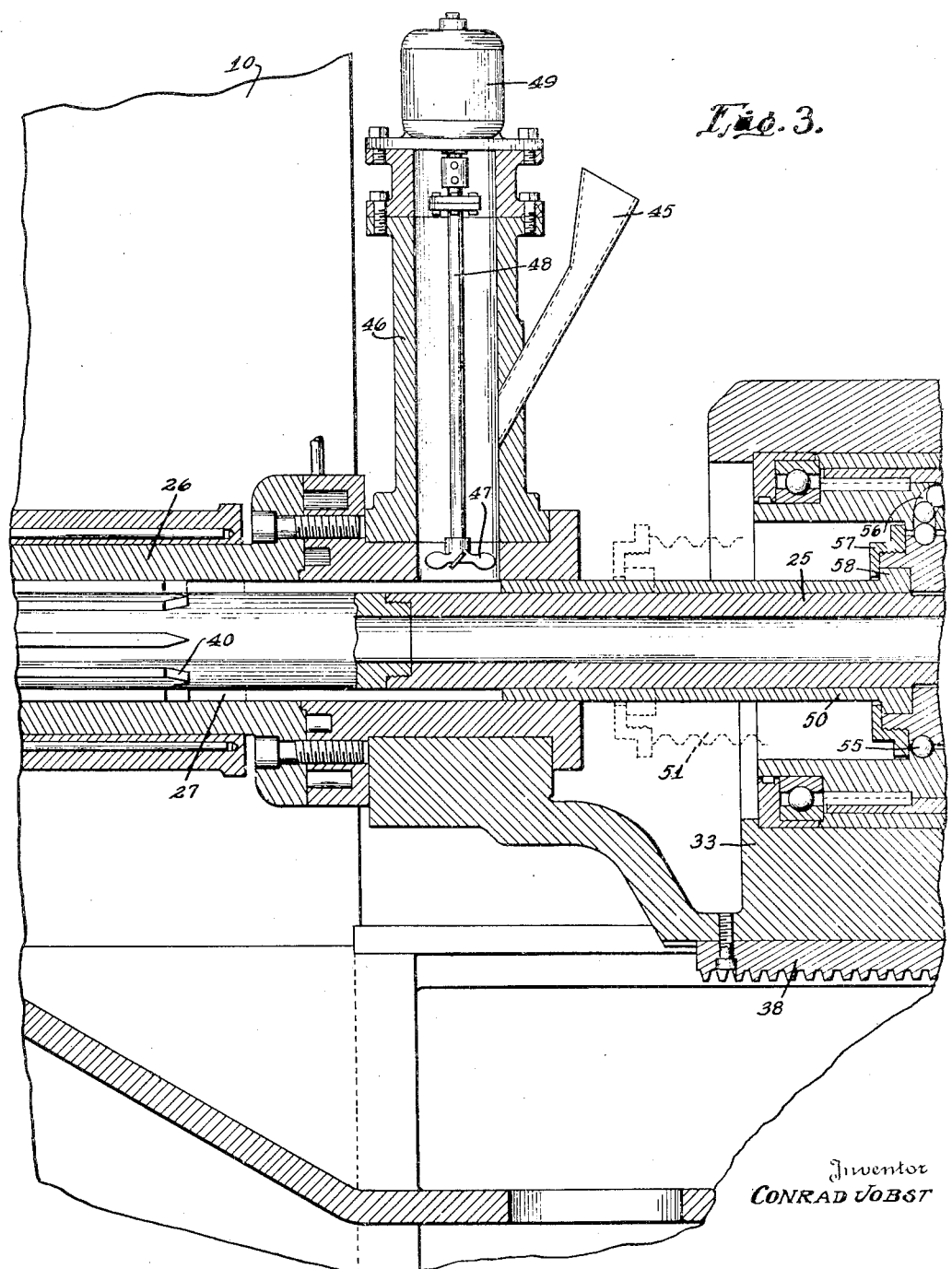
Fig. 3 is a central longitudinal sectional elevation through an intermediate portion of the injector mechanism, parts being broken away.
Figure 4:
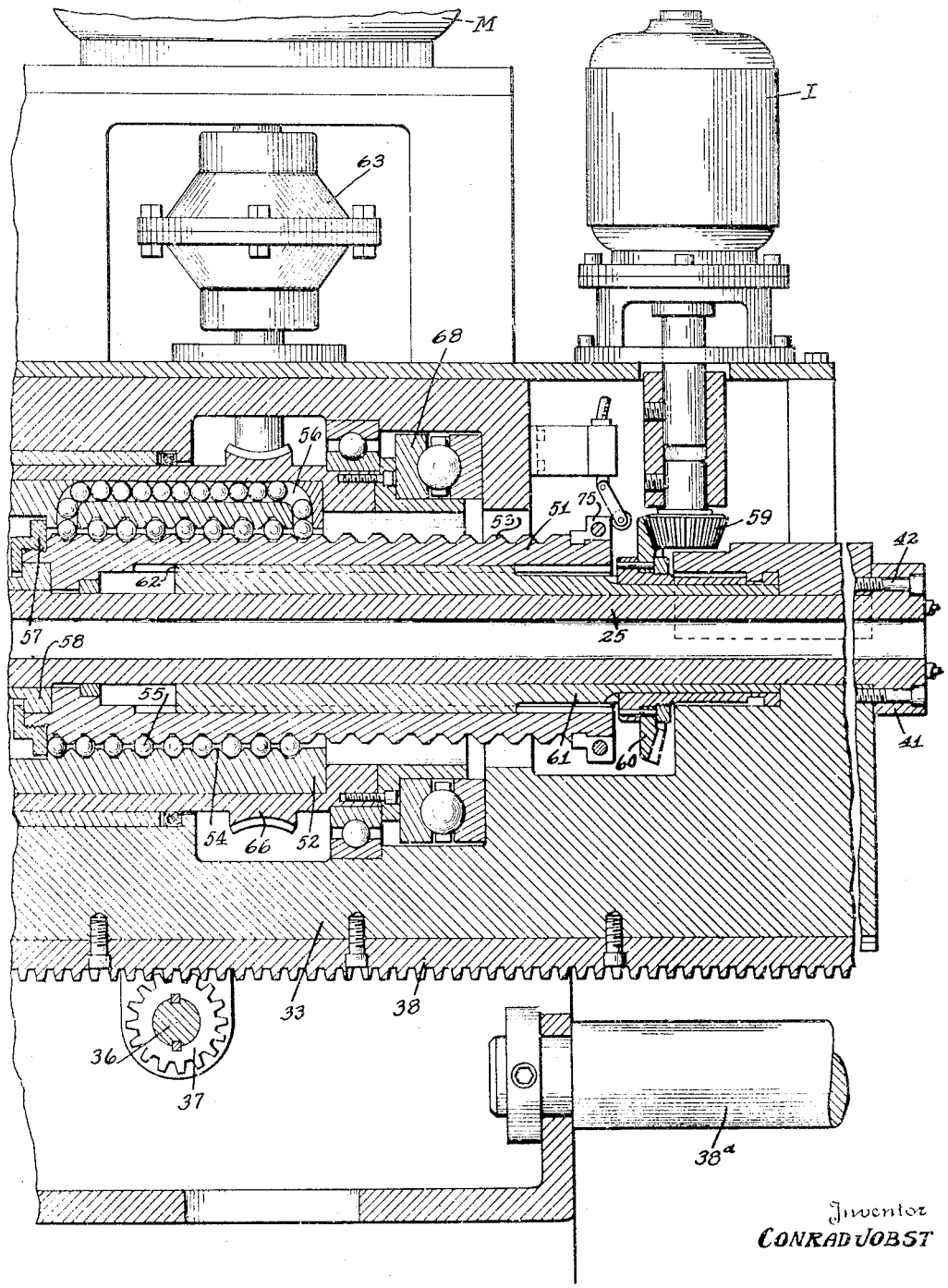
Fig. 4 is a similar view of the right-hand portion of the machine.

Figs. 2, 3, and 4 together provide a composite view of the injector mechanism.

Figure 6:
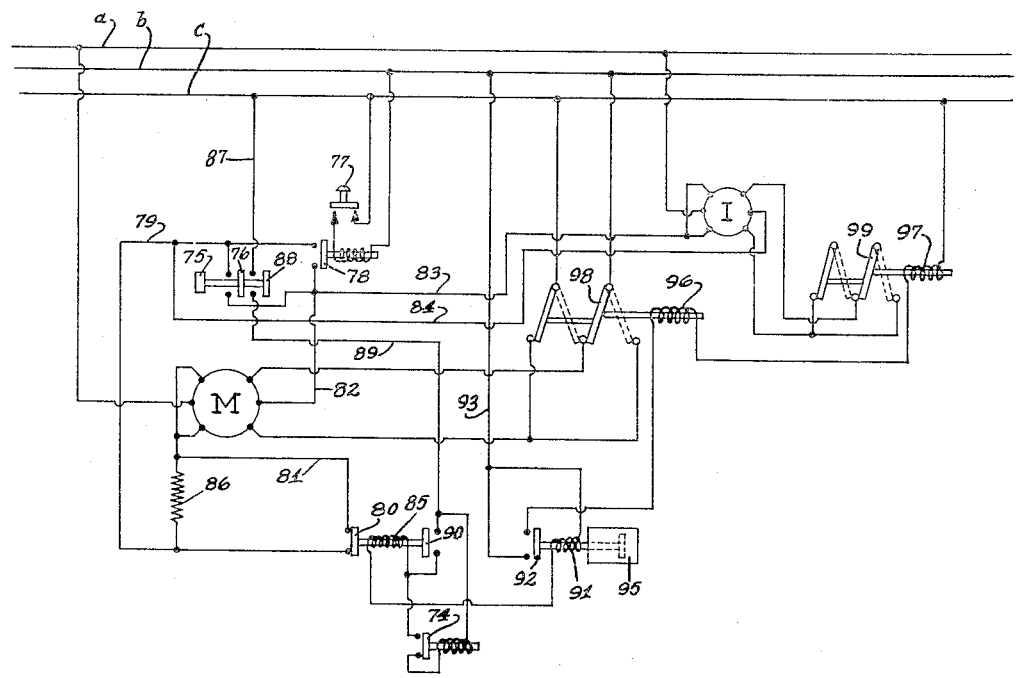
Figure 5:
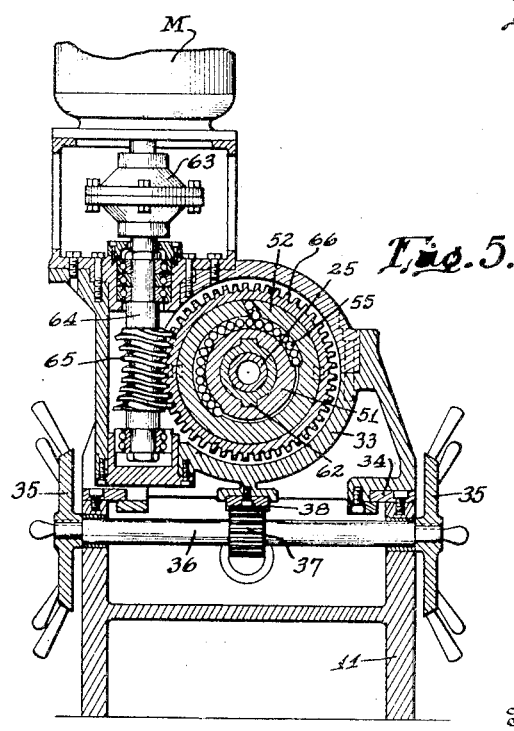

Fig. 5 is a cross-sectional elevation showing gearing between the main motor and the injector, and Fig. 6 is a wiring diagram of the electric motors and controls.

Figure 1:
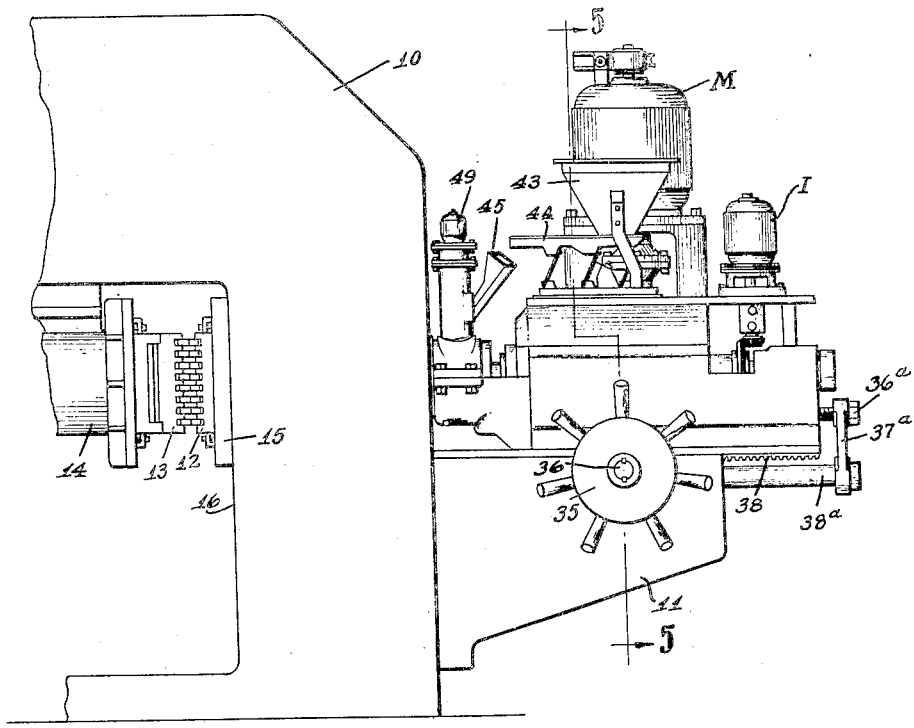

Referring to Fig. 1, the operating parts of the machine are mounted on a stationary frame 10 including an extension 11 providing a support for the injector mechanism. The mold comprises a stationary section 12 or die plate having a fixed mounting on the machine frame and a movable section or die plate 13 on a carriage 14 mounted for reciprocation horizontally for opening and closing the mold. As shown in Fig. 2, the stationary mold section 12 is bolted to a platen 15 which in turn is bolted to a stationary abutment plate 16 forming part of the machine frame. The movable mold section 13 is connected through a backing plate 17 and a plate 18 to the carriage 14.

The molding material is injected into the molds through an injection nozzle comprising a core 25 and a tubular member 26 surrounding the core and spaced therefrom to provide an annular passageway or channel 27 for the molding material. The forward end portions of the core 25 and member 26 are tapered so that the annular channel 27 converges and merges into a cylindrical channel 28 which extends through the tip 29 of the nozzle, said tip being in the form of a short tube threaded into the member 26. The tip 29 abuts against the mold plate 12. A valve 30 mounted within the tip 29 is formed with a stem which extends through an opening in the plate 12 into position to engage a rod 31 mounted in the carriage and serving to open the valve when the mold is closed. The valve operates to close the passageway through the tip of the injection nozzle when the mold is open.

The injector mechanism is supported on a carriage comprising a casting 33 mounted for sliding movement on tracks 34 (Fig. 5) permitting the nozzle to be moved into and out of engagment with the mold. The carriage 33 is moved by means of a hand wheel or wheels 35 on a shaft 36 journaled in the frame 11. A pinion 37 keyed on the shaft runs in mesh with a rack 38 bolted to the casting 33. The injector is held locked in its forward position by a stop bolt 36ª (Fig. 1) on an arm 37ª keyed to a rock shaft 38ª.

The core 25 is held centered within the shell 26 by spaced parallel ribs 40 formed on the core. The core is extended rearwardly in the form of a tubular shaft and formed at its outer end (Fig. 4) with a flange 41 secured to the casting 33 by bolts 42.

The molding compound is placed in a hopper 43 and is fed therefrom by a vibrator 44 to a chute 45 which opens into a tower 46 the lower end of which opens into the annular passageway 27. A propeller 47 within the tower is attached to the lower end of a shaft 48 connected to the shaft of an electric motor 49 which drives the propeller for feeding the molding material into the channel 27. The molding material is fed into the channel 27 in powdered or granular form and fed forward through the injection nozzle by means of a tubular injection plunger 50 which is reciprocated lengthwise within said channel and also rotated as hereinafter described.

The means for reciprocating and rotating the injection plunger 50 includes a main electric motor M and an auxiliary electric motor I having operating connections with the plunger through telescopically arranged tubular driving elements 51 and 52. The driving element 51 is in the form of a tubular shaft surrounding and concentric with the core 25 and is formed on its outer cylindrical surface with a helical thread 53 or rib. The driving element 52 is of tubular form and surrounds the shaft 51 and is formed on its inner surface with a helical thread or rib 54. Steel bearing balls 55 run in the channels formed by the ribs 53 and 54 and serve as power transmitting elements. The member 52 is formed with a channel 56 serving as a return passageway through which the balls 55 are automatically returned from the forward to the rear end of the member 52.

The injection plunger 50 is directly connected to the forward end of the driving shaft 51 by means of a collar 57 threaded on said shaft and engaging a shoulder 58 formed on the rear end of the plunger 50. The shaft of the motor I has connected thereto a bevel pinion 59 which drives a gear 60 keyed to a tubular shaft 61 mounted for rotation on the stationary shaft 25. The member 61 is formed with longitudinal ribs 62 which are slidable in grooves formed in the inner surface of the surrounding driving member 51.

The shaft of the motor M is connected through a coupling 63 (Fig. 5) with a vertical worm shaft 64 which is journaled in the carriage 33 and formed with a worm 65 running in mesh with a worm gear 66 surrounding and keyed to the driving member 52.

The motor I operates through the gears 59, 60 and shaft 61 to rotate the helical drive shaft 51 at a comparatively high speed. The injector plunger 50 is thus rotated and at the same time moved forward with a spiral or helical motion as the drive shaft 51 is advanced helically through the member 52. The rate at which the shaft 51 moves forward is increased to some extent by the motor M rotating the driving member 52 in the opposite direction from that of the shaft 51, but at a comparatively slow speed. The motors thus operate to move the plunger 50 forward rapidly from its retracted position (Fig. 3), thereby moving molding material forward toward the mold. The channel 27 serves as a heating chamber in which the granular or powdered molding material is reduced to a molten or plastic condition preparatory to entering the mold cavities. Heat for this purpose is supplied by electric heating elements 67 (Fig. 2).

After the molding material has been moved forward to the mold, a greatly increased pressure of the injection plunger is required for forcing the material through the restricted passageways through the tip of the nozzle and the sprue channels into the mold and compacting it within the mold cavities. This increased pressure is supplied by the main motor M which continues to operate through the speed-reduction worm gearing and rotate the driving element 52 after the motor I has been arrested by the back pressure of the molding material. Such rotation is in a direction to move the drive shaft 51 forwardly. End thrust ball bearings 68 take up the back thrust of the driving member 52.

As the molds are completely filled, the pressure of the molding material therein increases and automatically operates means to introduce an impedance into the field circuit of the motor M and thereby reduces the driving torque. Such means (see Fig. 2) includes a rod 70 mounted for lengthwise sliding movement in the mold section 13, with the forward end of the rod in position to contact the molding material in the mold cavity or sprue channel. A coil spring 71 is held under compression between said rod and tubular backing member 72 adjustable to vary the pressure on said spring. A lever 73 is mounted with one end bearing against the rod 70 and the other end in position to engage and operate a switch 74. When the pressure in the mold is built up to a certain point, it moves the rod 70 against the compression force of the spring 71 and operates the switch 74, thereby throwing resistance into the motor circuit as presently described.

When the helical drive shaft 51 is retracted, a stop 75 thereon (Fig. 4) operates a limit switch 76 for opening the motor circuits and resetting the control mechanism as hereinafter described.

Referring to the wiring diagram Fig. 6, the motors and electrical controls are supplied with current from the mains a, b, and c of a three-phase system.

*Operation*

Assuming the injector plunger 50 to be in its retracted position, a cycle of operations is initiated by pressing a push button 77 (Fig. 6), thereby energizing the magnet of a relay switch 78 and closing the switch. This establishes circuits for the field windings of the motors M and I. The circuit for the field of motor M includes a conductor 79, switch 80, conductor 81 extending to the motor, the circuit being extended from the motor through a conductor 82 to the switch 78. Conductors 83 and 84 lead from the conductors 82 and 79 respectively to the field coils of the motor I. The motors are thus energized and operate the helical driving elements 51 and 52. The motor I, geared directly to the shaft 51, operates the latter at a comparatively high speed so that the injector plunger 50 is moved forward quickly with a spiral or helical movement, thus advancing a charge of the molding material, the rotary movement serving to distribute the material uniformly within tubular channel 50. The forward movement of the drive shaft 51 is supplemented or augmented by the motor M which rotates the driving element 52 at a comparatively slow speed in a direction opposite to that of the shaft 51.

As the molding material which has been heated to a molten condition in the forward portion of the channel 27 is forced through the tip of the injector nozzle into the mold cavities, the back pressure is materially increased and built up to a degree at which it overcomes the torque of the motor I so that the latter is stopped. The continued operation of the main motor M causes the injector plunger to move forwardly at a comparatively slow speed, forcing the material to enter and fill the mold cavities. The back pressure of the molding material when the mold cavities are completely filled and the molding material compacted therein, operates through the rod 70 (Fig. 2) to close the switch 74. This establishes a circuit for the magnet coil 85 (Fig. 6) of the switch 80, thereby opening the latter and introducing a resistance 86 into the field circuit of motor M, thus reducing the torque of the motor. The circuit for the relay coil 85 may be traced from the main c through conductor 87, limit switch 88, conductor 89, switch 74, coil 85, magnet coil 91 of a time delay switch 92, and conductor 93 to main b.

The reduced torque of the motor M prevents a destructive or excessive strain being placed on the machine, and allows the motor to be stopped by the back pressure of the molding material. The motors M and I remain energized and hold the mold tightly closed during the hardening or setting of the molding material. The motors are then reversed and operate to retract the injector plunger. Such reversing of the motors is under the control of the timer device 95 which delays the operation of the time limit switch 92. When the switch 92 is closed, it completes a circuit for the reversing switch magnet coils 96 and 97 of the motors M and I respectively. This circuit may be traced from the main b through conductor 93, switch 92 and through the coils 96, 97 to main c. The reversing switches 98 and 99 of the motors M and I being reversed, the motors are started in reverse and withdraw the drive shaft 51 and the injector plunger. As the drive shaft 51 reaches the limit of its backward movement, it operates the limit switch 76, thereby opening the field circuits of the motors, and also opens the switch 88 so that the pressure-operated switch 74 is opened. This deenergizes the relay magnets 85 and 91. The switch 80 is therefore closed and the resistance 86 short circuited. The reversing switches 98 and 99 are also operated to forward position, thus completing the cycle.

It will be noted that the forward or rearward movement of the helical driving member 51 in the direction of its length, depends upon the relative rotation of the members 51 and 52. If the driver 51 encounters abnormal resistance to its forward movement, while the motors are running under full driving power, such resistance will operate first to arrest the rotation of the shaft 51 and the motor I, and then the main motor M, as it continues to run, operates to reverse the rotation of the shaft 51, so that the two driving elements 51 and 52 are rotated as a unit in the same direction and at the same speed. As the shaft 51 is now being driven backward, it drives the motor I backward in opposition to its forward driving torque. This operation serves as a safety means to limit the forward driving power applied by the main motor to the helical drive shaft 51.

Modifications may be resorted to within the spirit and scope of my invention.

I claim:

1. The combination of a driven element, a driving element connected thereto, a power motor, gearing connecting the motor with said driving element and operable to apply a driving torque to said driving element and cause it to move said driven element forward, a second power motor, and speed reduction gearing connecting said second motor to the driving element, said second motor being geared and normally operable to apply a comparatively greater driving torque to said driving element and drive it at a reduced speed.

2. The combination of a driven element, a driving element connected thereto, a power motor, gearing connecting the motor with said driving element and operable to apply a driving torque to said driving element and cause it to move said driven element forward, a second power motor, and speed reduction gearing connecting said second motor to the driving element, said second motor being geared and normally operable to apply a comparatively greater driving torque to said driving element and drive it at a reduced speed, and automatic control means by which said motors are caused to operate concurrently, said second motor being operable to apply a continued driving force to said driving element when the first mentioned motor is arrested by resistance of the driven element to said forward movement.

3. A driven element, a drive shaft mounted for rotation and connected to said driven element, an electric motor, gearing between said motor and drive shaft for rotating the latter, said shaft having a helical driving surface, a tubular shaft surrounding and telescopically connected with said drive shaft, said tubular shaft having a helical driving surface opposite said surface of the drive shaft, driving balls interposed between said helical surfaces and forming driving elements, a second electric motor, speed reduction gearing connecting said second motor with said tubular shaft for rotating the latter at a comparatively slow speed, said tubular shaft being mounted for rotary movement and held against lengthwise movement, whereby relative rotation of said members produces lengthwise movement of the driven element, and automatic control means for causing the motors to run concurrently until the rotation of the drive shaft is arrested by a load on the driven shaft, and then causing a continued operation of the said second motor while the driving torque of the first motor is maintained.

4. The combination of telescopically-arranged driving elements including a rotary drive shaft and a tubular shaft surrounding said drive shaft, said drive shaft being mounted for rotation and for lengthwise movement, a driven element connected to the drive shaft for lengthwise movement therewith, said shafts having respectively exterior and interior helical surfaces providing a helical race, driving balls in said race, a motor, means providing a driving connection between the motor and said drive shaft for rotating the latter and permitting lengthwise movement thereof, the said tubular shaft being mounted for rotative movement and held against lengthwise movement, a second motor, speed reduction gearing between said second motor and said tubular shaft by which the latter is driven at a comparatively slow speed, and automatic control mechanism for causing said motors to operate simultaneously and thereby driving the said driven element until the first mentioned motor is arrested by resistance of the driven element to forward movement, and causing the second motor to impart a continued rotation to said tubular shaft after the other motor is arrested and thereby drive the said driven element at a reduced speed.

5. The combination of telescopically-arranged driving elements including a rotary drive shaft and a tubular shaft surrounding said drive shaft, said drive shaft being mounted for rotation and for lengthwise movement, a driven element connected to the drive shaft for lengthwise movement therewith, said shafts having respectively exterior and interior helical surfaces providing a helical race, driving balls in said race, a motor, means providing a driving connection between the motor and said drive shaft for rotating the latter and permitting lengthwise movement thereof, the said tubular shaft being mounted for rotative movement and held against lengthwise movement, a second motor, speed reduction gearing between said second motor and said tubular shaft by which the latter is driven at a comparatively slow speed, automatic control mechanism for causing said motors to operate simultaneously and thereby drive the said driven element, and automatic means operable by predetermined resistance to forward movement of the driven element to introduce an impedance into the circuit of said second motor and thereby reduce the driving torque of the motor.

6. The combination of a driven element mounted for lengthwise and rotative movement, a driving element comprising a tubular drive shaft mounted for lengthwise and rotative movements and directly connected to said driven element, a power transmitting shaft within said tubular drive shaft and having driving connection for rotating the drive shaft and on which the latter is mounted for lengthwise movement relative to the said drive shaft, an electric motor geared to said power transmitting shaft, said drive shaft having a helical thread on its cylindrical surface, a second tubular shaft mounted concentrically with and in telescopic relation to said drive shaft and having a helical thread on its interior surface, power transmitting balls running in the raceway formed by said threads, a second electric motor, and gearing connecting said second motor with said second driving element.

7. A driving element mounted for rotation about an axis and for bodily movement in a direction lengthwise of said axis, a second driving element mounted for rotation about an axis and held against movement lengthwise of its axis of rotation, interconnected driving means between said elements by which rotation of either said element relative to the other imparts lengthwise movement to said first mentioned driving element, electric motors individual to said driving elements, gearing providing driving connections between the motors and their respective driving elements, one said motor being operable to rotate its driving element at a lower speed and a greater torque than the speed and torque of the other motor, and automatic control means for causing the motors to operate concurrently until the low torque motor is arrested by a load resistance to the lengthwise movement of said first mentioned driving element and then causing a continued operation of the higher torque motor.

8. The combination of telescopically-arranged driving elements mounted for rotation about a common axis, one said element being mounted for lengthwise movement, the other said element being held against lengthwise movement, said elements have respectively exterior and interior helical surfaces providing a helical raceway therebetween, power transmitting balls in said raceway, electric motors geared respectively to said driving elements, one said motor being powered to apply to its said element a comparatively low torque and geared to drive it at a comparatively high speed and the other motor being powered to apply to its said element a comparatively high torque and geared to drive it at a comparatively low speed, means for increasing the resistance to the rotation of the high speed element and thereby stopping its motor while operation of the other motor is maintained, and electric control means for said motors operable automatically to introduce an impedence into the circuit of the high torque motor after said stopping of the low torque motor, thereby reducing the driving torque applied by the high torque motor while maintaining a continued application of driving torque by both motors.

9. The combination with power transmitting mechanism including telescopically mounted elements having cooperating helical driving surfaces, said elements being relatively movable in the direction of their axis by a relative rotation, of power motors individual to said elements, driving mechanism through which the motors are geared to said elements respectively, controlling mechanism including means for causing the said motors to rotate said driving elements in unison for bringing said elements to a predetermined relative position and then arresting one said motor and maintaining the other in operation.

10. The combination with power transmitting mechanism including telescopically mounted elements having cooperating helical driving surfaces, said elements being relatively movable in the direction of their axis by a relative rotation, of power motors individual to said elements, driving mechanism through which the motors are geared to said elements respectively, one said motor being powered and geared to its said element to normally drive it at a higher speed and with a lower torque than the normal speed and torque at which the other motor drives its said element, means for applying a progressively increasing resistance to the rotation of said elements by which the lower torque motor is arrested while the other motor continues to operate, and automatic control mechanism by which a further increase in said resistance after the low torque motor is arrested reduces the driving torque of the other motor and causes both motors to maintain a driving torque after they are stopped.

11. The combination with power transmitting mechanism including telescopically mounted elements having cooperating helical driving surfaces, said elements being relatively movable in the direction of their axis by a relative rotation, of power motors individual to said elements, driving mechanism through which the motors are geared to said elements respectively, one said motor being geared to normally drive its said element at a comparatively slow speed and powered to apply a comparatively great driving torque to its said element, the other motor being geared to normally drive its said element at a comparatively high speed and powered to apply thereto a comparatively small torque, means for applying to said elements a resistance to their said relative rotation and increasing it during said rotation and thereby stopping the said smaller torque motor, and automatic controlling mechanism for maintaining the larger torque motor in operation and causing both motors to maintain a driving torque after the low torque motor is stopped.

12. The combination with power transmitting mechanism including telescopically mounted elements having cooperating helical driving surfaces, said elements being relatively movable in the direction of their axis by a relative rotation, of power motors individual to said elements, and driving mechanism through which the motors are geared to said elements respectively, one said motor being geared to normally drive its said element at a comparatively slow speed and powered to apply a comparatively great driving torque to its said element, the other motor being geared to normally drive its said element at a comparatively high speed and powered to apply thereto a comparatively small torque, the slow speed driving motor being powered to reverse the other motor and drive it in reverse direction when said elements have applied thereto a high resistance to their relative movement.

CONRAD JOBST.

REFERENCES CITED

The following references are of record in the file of this patent:

UNITED STATES PATENTS

| Number | Name | Date |
| --- | --- | --- |
| 1,831,080 | Schmidt | Nov. 10, 1931 |
| 1,886,665 | Field | Nov. 8, 1932 |
| 1,967,482 | Schmidt | July 24, 1934 |
| 2,164,245 | Kienzle | June 27, 1939 |
| 2,226,677 | Vickham | Dec. 31, 1940 |
| 2,337,223 | Armitage | Dec. 21, 1943 |
| 2,362,449 | Brackett | Nov. 14, 1944 |
| 2,290,899 | Stapelfeldt | July 28, 1942 |
| 2,372,833 | Jobst | Apr. 3, 1945 |

FOREIGN PATENTS

| Number | Country | Date |
| --- | --- | --- |
| 677,487 | Germany | June 27, 1939 |